UNITED STATES PATENT OFFICE.

ROBERT HAERING, OF MELROSE, (NOW RESIDING IN MONTREAL, CANADA,) ASSIGNOR TO JOHN B. NEWBROUGH, OF NEW YORK, N. Y.

IMPROVED MODE OF MOUNTING ARTIFICIAL TEETH.

Specification forming part of Letters Patent No. 85,927, dated January 19, 1869.

To all whom it may concern:

Be it known that I, ROBERT HAERING, of Melrose, Westchester county, New York, now residing in Montreal, Canada, have invented an Improvement in Mounting Artificial Teeth; and I do hereby declare the following to be a full, clear, and exact description of the same.

My invention relates to an improvement in securing artificial teeth upon bases or plates of hard or vulcanized rubber or other gum.

In order to enable others skilled in the art to practice my invention, I will now proceed to describe the manner of carrying it into effect.

A plaster cast of the mouth to which the teeth are to be fitted is first made; a coating of wax, corresponding in shape and thickness to the "base" required, is then applied to the cast and round the bases of the teeth which are thus held in their proper position.

The teeth and base are now covered with plaster, which is applied in a soft state, but soon hardens, forming the second division of a mold, the other part of which is the cast first made.

After the portion of the mold last made has hardened, the two divisions are separated, the wax is removed, and prepared rubber is substituted for the same, the sections of the mold being brought together so as to force the gum into all the interstices formerly occupied by the wax.

The mold is then placed in an oven and subjected to heat for such a length of time as may be necessary to harden the gum.

When the operation is complete the plaster is broken away and the teeth will be found securely "set" or "mounted" on a base of gum, which is hard, tough, corresponds in shape to the wax base first made, and possesses many advantages over bases made of ordinary materials.

Without here claiming, broadly, the application of hard rubber or gum as a base for artificial teeth—

I claim as my invention and desire to secure by Letters Patent—

Artificial teeth having gum bases to which the teeth are secured, as described—that is, by "setting" the teeth in prepared gum on a mold, embedding the whole in plaster, and hardening the gum by the application of heat.

In testimony whereof I have signed my name to this specification in the presence of two subscribing witnesses.

ROBERT HAERING.

Witnesses:
SAM. JOHN STORRS,
JOHN A. FOSTER.